United States Patent
Wu et al.

(10) Patent No.: US 6,813,688 B2
(45) Date of Patent: Nov. 2, 2004

(54) SYSTEM AND METHOD FOR EFFICIENT DATA MIRRORING IN A PAIR OF STORAGE DEVICES

(75) Inventors: Chia Y. Wu, Newark, CA (US); Whay S. Lee, Newark, CA (US); Nisha D. Talagala, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 280 days.

(21) Appl. No.: 09/729,762

(22) Filed: Dec. 4, 2000

(65) Prior Publication Data

US 2002/0103966 A1 Aug. 1, 2002

(51) Int. Cl.⁷ ................................................ G06F 11/16
(52) U.S. Cl. ............................................ 711/114; 714/6
(58) Field of Search ........................................ 711/114

(56) References Cited

U.S. PATENT DOCUMENTS

| | | | |
|---|---|---|---|
| 5,239,445 A | 8/1993 | Parks et al. ................. | 361/686 |
| 5,590,375 A | 12/1996 | Sangveraphunsiri et al. .. | 710/21 |
| 5,740,397 A | 4/1998 | Levy ......................... | 711/114 |
| 5,778,252 A | * 7/1998 | Sangveraphunsiri et al. .. | 710/21 |
| 6,073,220 A | * 6/2000 | Gunderson ................. | 711/162 |

OTHER PUBLICATIONS http://www.it.bton.ac.uk/burks/burks/pcinfo/hardware/atafaq/atafq2.html, "Intruction/Hardware," Mar. 24, 2000, 10 pages.
Western Digital, "Enhanced IDE Interface (EIDE)," http://www.wdc.com/products/drives/drivers-ed/eide.html, Oct. 7, 1998, 3 pages.
Intel, "IDE Controller Functional Description," 2000 Intel Corporation, 10 pages.
Intel, "IDE Controller Register Description (PCI Function 1)," 2000 Intel Corporation, 13 pages.
"CP20.64 Intelligent Disk Drive," Conner Peripherals, Product Manual, Revision 1, Oct. 1990, 9 pages.
Alex T. Ivopol, "IDE–Hardware Reference & Information Document," Jan. 19, 1994, 17 pages.
Promise Technology, Inc., About Promise; White Papers, "A Promising Future: Setting The Trends in IDE," http://www.promise.com/Docs/Papers/trendsetting.html, Jul. 31, 2000, 6 pages.
Promise Technology, Inc., About Promise; White Papers, "Take Your Drives Beyond Ultra Levels of Performance with IDE RAID," http://www.promise.com/Docs/Papers/aboutideraid.html, Jul. 31, 2000, 9 pages.
Promise Technology, Inc., "PCI Card for Ultra ATA/66 Drives; Ultra 66," 1998, 2 pages.
ARCO Computer Products, Inc., User's Manual, "DupliDisk PCI," 1998, 16 pages.

(List continued on next page.)

*Primary Examiner*—David L. Robertson
(74) *Attorney, Agent, or Firm*—Robert C. Kowert; Meyertons, Hood, Kivlin, Kowert & Goetzel, P.C.

(57) ABSTRACT

A system may include mirroring logic, a controller, and first and second devices (e.g., data storage devices). The first and second devices may include multiple registers. The mirroring logic may be configured in a first mode wherein the mirroring logic allows the registers of the first device to be accessed from the controller and prevents the registers of the second device from being accessed from the controller. The mirroring logic may be configured in a second mode wherein the mirroring logic allows the registers of the second device to be accessed from the controller and prevents the registers of the first device from being accessed. The first and second devices may be configured via the mirroring logic such that the first and second devices are selected simultaneously. When selected simultaneously, the first and second devices may carry out a subsequently issued command substantially simultaneously.

55 Claims, 8 Drawing Sheets

OTHER PUBLICATIONS

RAIDZONE Technology, "RAIDZONE Technology Overview," 1999 Consensys Corp., 4 pages.

RAIDZONE Technology, "RAIDZONE Frequently Asked Questions," 1999 Consensys Corp., 2 pages.

Winn L. Rosch Hardware Bible, Electronic Edition, "Chapter 9: Storage Interfaces," 1997, 36 pages.

Peter McLean, Information Technology–AT Attachement–3 Interface (ATA–3), Revision 6, Oct. 26, 1995, pp. 1–41 and 120–148.

* cited by examiner

SYSTEM AND METHOD FOR EFFICIENT DATA MIRRORING IN A PAIR OF STORAGE DEVICES

BACKGROUND OF THE INVENTION

1. Field of the Invention

This invention relates to computer data storage systems, and more particularly to disk mirroring techniques in computer data storage systems.

2. Description of the Related Art

A typical computer system includes one or more hard disk drives (i.e., disk drives) for storing data. While the reliabilities of disk drives continue to improve, it is only a matter of time before a given disk drive fails. Data storage systems commonly implement one of several redundant array of inexpensive/independent disks (RAID) techniques in order to allow stored data to remain available despite a failure of one of the disk drives.

RAID level 1, or disk mirroring, stores identical copies of data on two different disk drives. Disk mirroring involves the exact replication of data. A mirrored disk array uses twice as many disks as a non-redundant disk array. Data written to one disk is also written to a redundant disk, such that there are always two physical copies of the same information. When data is read, it can be retrieved from the disk with the shorter queuing, seek, and rotational delays. If a disk drive of a RAID-1 system fails, the other copy is used to service requests and reconstruct a new mirrored disk. Disk mirroring is frequently used in database applications where availability and transaction rates are more important than storage efficiency. Since a block of data needs to be written to two different locations, a write performance penalty may be associated with mirroring.

Intelligent/Integrated drive electronics (IDE) is an interface technology for mass storage devices (e.g., disk drives) wherein the controller is integrated into the drive, and AT Attachment (ATA) is a disk drive interface standard. The two terms and their acronyms are often used interchangeably. Several versions of the ATA standard exist, including the basic ATA standard, Fast ATA, ATA-2, Fast ATA-2, ATA-3, and Ultra ATA. As used herein, the term "AT attachment" and the acronyms "ATA" and "IDE" refer to all variants of ATA-type or IDE-type interfaces. The basic ATA standard (ANSI X3.221-1994) supports a single 16-bit parallel data channel which may be shared by two separate devices configured as master and slave.

Today's disk drive market consists mainly of AT attachment (ATA), small computer systems interface (SCSI) and fibre channel drives. Fibre channel and SCSI drives are employed in enterprise class storage systems, while ATA drives are often limited to desktop applications. At the time of this disclosure, ATA drives are often a factor of between 2 to 3 times cheaper than SCSI drives. The ATA bus is a shared bus between a host and a maximum of 2 ATA drives.

When two ATA drives are connected to an ATA bus, they are popularly referred to as a master/slave pair. Both the master and slave drives include a set of interface registers that provide control and status information. Whenever the host writes to a register, the information is written into the corresponding registers of both the master drive and the slave drive. For example, during ATA operations, the host selects the desired drive by writing 0 (selects master drive) or 1 (selects slave drive) to a drive selection bit in an ATA device/head register. The host then writes a command to an ATA command register. Both the master drive and the slave drive check the device selection bit, and only the selected drive executes the command and responds to the host.

FIG. 1 is a diagram of one embodiment of a typical computer system 10 including a host 12 coupled to two devices 16A–16B via an ATA controller 14 and an ATA bus 18. Devices 16A and 16B include ATA interfaces, and may be ATA storage devices. Examples of ATA storage devices include hard disk drives, compact disk read only memory (CD-ROM) drives, and tape drives. Devices 16A and 16B in FIG. 1 are configured to form a "master/slave" device pair according to the ATA standards. Either device 16A or device 16B is configured to be a "master" device, and the other device 16 is configured to be a "slave" device. Host 12 accesses devices 16A and 16B via ATA controller 14 and ATA bus 18. The current ATA standards allow one or two devices to be coupled to host 12 via ATA controller 14. It is noted that many computer systems include two ATA controllers, thus allowing up to four devices with ATA interfaces to be coupled to a host.

In the known embodiment of FIG. 1, ATA bus 18 is typically implemented as a flat ribbon cable having multiple conductors with three connectors attached thereto. A first of the three connectors is located at one end of the ribbon cable, and the other two connectors are positioned close together near the other end of the ribbon cable. ATA controller 14 is coupled to the first connector, and devices 16A and 16B are coupled to the other two connectors. ATA bus 18 acts as a "shared bus" coupling devices 16A and 16B to ATA controller 14.

ATA bus 18 includes a data bus 20, a control bus 22, and a status bus 24. Signal lines of data bus 20 are bidirectional signal lines which convey the ATA data signals between ATA controller 14 and devices 16A and 16B. The ATA data signals include data bus bit 0 (DD0) through DD15. Signal lines of control bus 22 convey the ATA control signals from ATA controller 14 to devices 16A and 16B. The ATA control signals include address signals and other control signals. The address signals include chip select 0 (CS0-), CS1-, device address bit 0 (DA0), DA1, and DA2. (The "-" symbol after a signal name indicates that the signal is active low; asserted when the signal is a logic low level and negated or deasserted when the signal is a logic high level.) The other control signals include input/output read (DIOR-), input/output write (DIOW-), direct memory access acknowledge (DMACK-), passed diagnostics (PDIAG-), and reset (RESET-).

Signal lines of status bus 24 convey the ATA status signals from device 16A or device 16B to ATA controller 14. The ATA status signals include direct memory access request (DMARQ), interrupt request (INTRQ), and input/output ready (IORDY). As described above, the current ATA standards allow only one of the devices 16A and 16B to be selected at any given time. Only the selected device drives the signal lines of status bus 24. Thus the current ATA standards rule out a situation where both devices 16A and 16B are driving one or more signal lines of status bus 24 at the same time.

In order to preclude a loss of critical data stored via disk drives, it is possible to implement a RAID 1 data storage system in the typical computer system 10 of FIG. 1. In this situation, devices 16A and 16B may form a mirrored pair of disk drives. However, as only one of the mirrored pair of disk drives may be accessed at any given time, a significant amount of time is spent sequentially writing data to one disk drive of the mirrored pair, and then writing the same data to the other disk drive of the mirrored pair. First one ATA drive must be selected and written to, and then the other drive is selected and written to with the same data. It would thus be desirable to have a mechanism for more efficiently mirroring data in storage systems such as ATA systems in which conventionally only one drive on a port may be written to at a time.

SUMMARY OF THE INVENTION

A circuit comprising mirroring logic configured to couple to a controller, a first device, and a second device may be provided. Various methods for configuring first and second devices (e.g., data storage devices) to carry out a command from a controller simultaneously, which may be embodied within the mirroring logic, may be provided. A system including the mirroring logic, the controller, and the first and second devices may be provided. The first and second devices may include multiple registers. The mirroring logic may be configured to operate in a first connect mode wherein the mirroring logic allows the registers of the first device to be accessed from the controller and prevents the registers of the second device from being accessed from the controller. The mirroring logic may also be configured to operate in a second connect mode wherein the mirroring logic allows the registers of the second device to be accessed from the controller and prevents the registers of the first device from being accessed. The first and second devices may be configured via the mirroring logic such that the first and second devices are selected simultaneously. When selected simultaneously, the first and second devices may carry out a subsequently issued command simultaneously.

In one embodiment, the registers of the first and second devices may be accessed via multiple control signals produced by the controller. The mirroring logic may be coupled to receive a portion of the control signals and configured to selectively provide the portion of the control signals to the first and second devices. In the first connect mode, the mirroring logic provides the portion of the control signals to only the first device such that the registers of only the first device are accessed. In the second connect mode, the mirroring logic provides the portion of the control signals to only the second device such that the registers of only the second device are accessed.

For example, in some embodiments the first and second devices may include AT Attachment (ATA) interfaces conforming to an ATA standard. In this situation, the control signals include ATA control signals, and the first and second devices are configurable to be selected in response to register accesses via the ATA control signals. The first and second devices carry out received commands only when selected. In one embodiment, when the mirroring logic is in the first connect mode, the mirroring logic provides the ATA address signals to only the first device such that the registers of only the first device are accessed. In the second connect mode, the mirroring logic provides the ATA address signals to only the second device such that the registers of only the second device are accessed.

In an embodiment, the mirroring logic may be coupled to receive a first set of status signals from the first device, and a corresponding second set of status signals from the second device. The mirroring logic may be configured to produce a third set of status signals dependent upon the first and second sets of status signals. The mirroring logic may provide the third set of status signals to the controller.

The mirroring logic may be further configurable to operate in a simultaneous write mode, wherein in the simultaneous write mode the mirroring logic is configured to: (i) provide all of the control signals to both the first and second devices, and (ii) produce the third set of status signals by logically ANDing corresponding status signals of the first and second sets of status signals.

The mirroring logic may be further configurable to operate in a normal mode, wherein in the normal mode the mirroring logic is configured to: (i) provide all of the control signals to both the first and second devices, and (ii) produce the third set of status signals by connecting together corresponding status signals of the first and second sets of status signals.

In general, an embodiment of a system may include the controller, the first and second devices (e.g., data storage devices), and the mirroring logic. As described above, the controller may be configured to produce multiple control signals, and the first and second devices may include multiple registers accessed via the control signals. The mirroring logic may be coupled to the first and second devices and to receive a portion of the control signals. The mirroring logic may be configurable to provide the portion of the control signals to: (i) only the first device in a first mode so that the registers of the second device are not accessed, (ii) only the second device in a second mode so that the registers of the first device are not accessed, and (iii) both the first and second devices in a third mode so that the registers of both the first and second devices are accessed. The mirroring logic may be configured to allow both the first and second devices to be selected simultaneously. The third mode may correspond to a normal mode or a simultaneous write mode.

One embodiment of the system may include a pair of devices (e.g., hard disk drives) each having an ATA interface conforming to an ATA standard, wherein one of the pair of devices is configured as a master device and the other device is configured as a slave device. The mirroring logic may be coupled to the pair of devices and to receive multiple ATA control signals, wherein the ATA control signals include multiple ATA address signals. The mirroring logic is configurable to operate in one of multiple modes comprising: (i) a first connect mode wherein the mirroring logic provides the ATA address signals to only the master device, and (ii) a second connect mode wherein the mirroring logic provides the ATA address signals to only the slave device. The mirroring logic may be configured to allow both the master and slave devices to be selected simultaneously.

The mirroring logic may be configured to enter the first connect mode in response to receiving a first connect mode command (e.g., three consecutive writes to the ATA features register). The mirroring logic may also be configured to enter the second connect mode in response to a second connect mode command (e.g., receiving three consecutive writes to the ATA device/control register).

The mirroring logic may produce a third set of ATA status signals dependent upon a first set of ATA status signals received from the master device and a corresponding second set of status signals received from the slave device. The mirroring logic may provide the third set of status signals to the controller.

In the normal mode, the mirroring logic: (i) provides the ATA address signals to both the master and slave devices, and (ii) produces the third set of ATA status signals by connecting together corresponding ATA status signals of the first and second sets of ATA status signals to behave as in a conventional ATA configuration. The mirroring logic may be configured to enter the normal mode in response to receiving a normal mode command (e.g., three consecutive writes to the ATA cylinder low register).

In the simultaneous write mode, the mirroring logic: (i) provides the ATA address signals to both the master and slave devices, and (ii) produces the third set of ATA status signals by logically ANDing corresponding ATA status signals of the first and second sets of ATA status signals. The mirroring logic may be configured to enter the simultaneous write mode in response to receiving a simultaneous write mode command (e.g., three consecutive writes to the ATA cylinder high register).

In a system comprising a controller (e.g., an ATA controller), a first storage device and a second storage device (e.g., ATA storage devices coupled to the same port of the ATA controller), wherein each of the pair of devices includes multiple registers mapped to the same register address space, a method for configuring the first storage device and the second storage device to carry out a command from the controller simultaneously includes writing to a first register in the address space to select the first storage device to respond to commands. The registers of the first storage device are prevented from being accessed. While the registers of the first storage device are prevented from being accessed, a write operation is directed to the first register in the address space to select the second storage device. As a result, both the first storage device and the second storage device are selected. The registers of both the first storage device and the second storage device are allowed to be accessed. While the registers of both the first and second storage devices are allowed to be accessed, a command is written to a command register in the register address space. The first storage device and the second storage device receive the command and both carry out the command approximately simultaneously.

Where the command is a write command, the method may include determining if the first storage device is ready to receive data, determining if the second storage device is ready to receive data, and performing the following if both the first storage device and the second storage device are ready to receive data: (i) allowing the registers of both the first storage device and the second storage device to be accessed, and (ii) writing a block of data to corresponding data registers of the first storage device and the second storage device, wherein the first storage device and the second storage device store the data approximately simultaneously.

The determining if the first storage device is ready to receive data may include: (i) preventing the registers of the second storage device from being accessed, and (ii) while the registers of the second storage device are prevented from being accessed, reading a value from a status register of the first storage device.

The determining if the second storage device is ready to receive data may include: (i) preventing the registers of the first storage device from being accessed, and (ii) while the registers of the first storage device are prevented from being accessed, reading a value from a status register of the second storage device.

Figure 1:
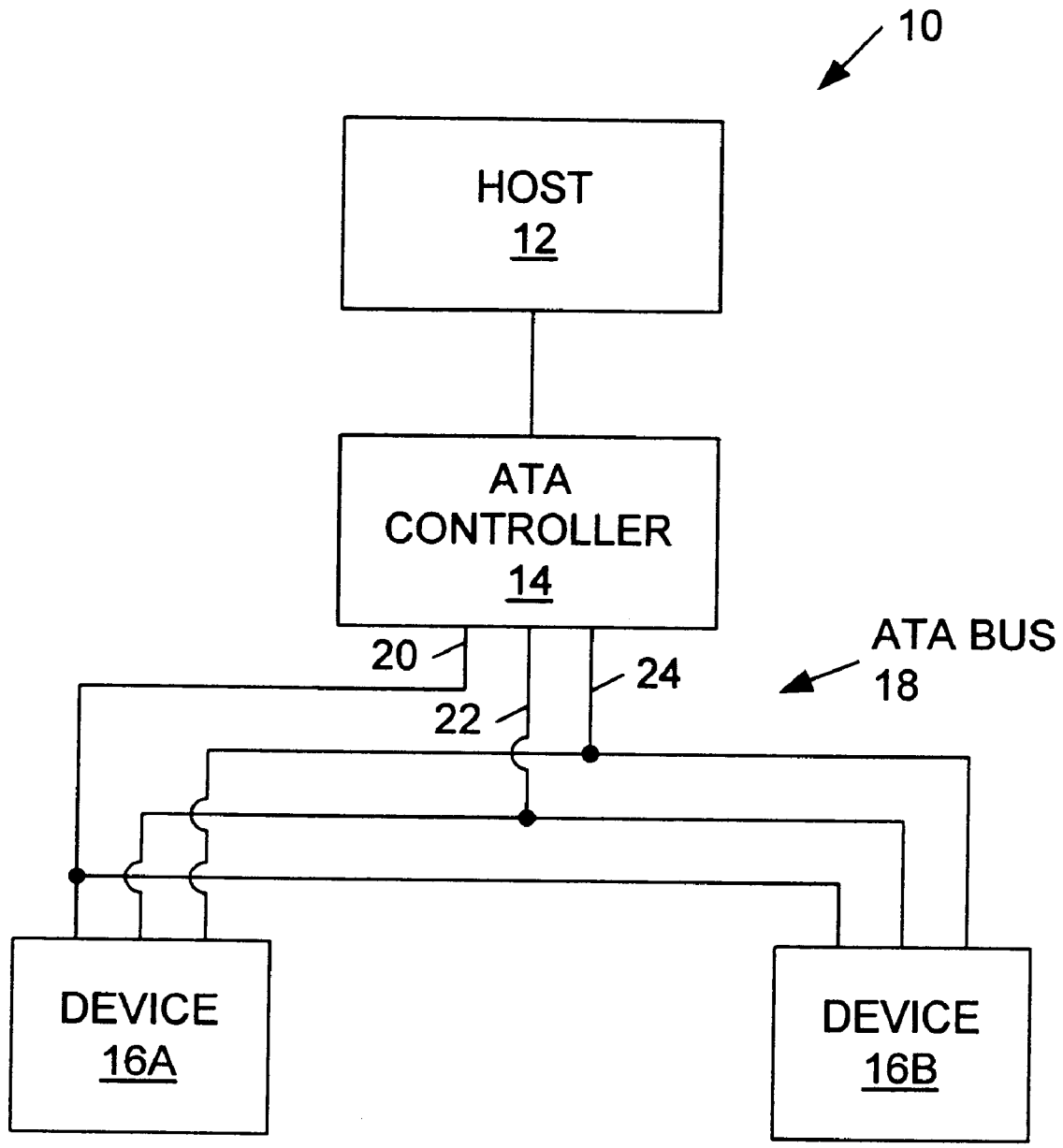
FIG. 1 is a diagram of one embodiment of a conventional computer system including a host coupled to two devices via an ATA controller and an ATA bus, wherein to perform a mirrored write operation, one of the two devices must be selected and written to, and then the other device must be selected and written to with the same data.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 2:
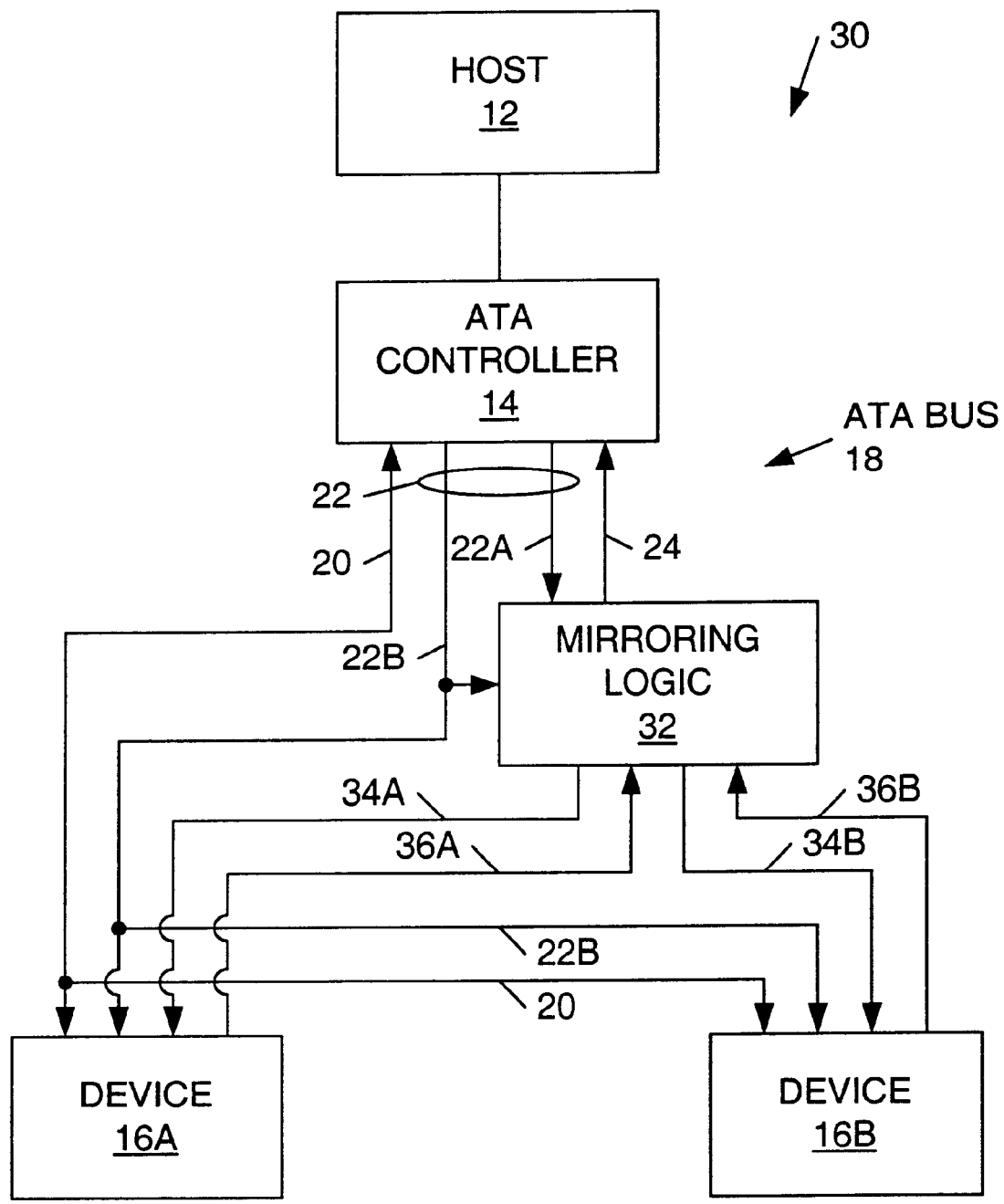
FIG. 2 is a diagram of one embodiment of a system including a host, ATA controller, two devices, and an ATA bus, wherein the system further includes mirroring logic coupled to the ATA controller and the two devices, and wherein the mirroring logic is configurable to allow the two devices to be selected simultaneously.

FIG. 2 is a diagram of one embodiment of a computer system 30 including host 12 coupled to devices 16A–16B via ATA controller 14, ATA bus 18, and mirroring logic 32. Devices 16A and 16B include ATA interfaces, and may be ATA storage devices. Examples of ATA storage devices include hard disk drives, compact disk read only memory (CD-ROM) drives, and tape drives. Devices 16A and 16B are configured to form a "master/slave" device pair according to the ATA standards. Either device 16A or 16B is configured to be a "master" device, and the other device 16 is configured to be a "slave" device.

Mirroring logic 32 is coupled between ATA controller 14 and devices 16A and 16B. As described in detail below, mirroring logic 32 is configurable to provide ATA address signals from ATA controller 14 to: (i) the master device only, (ii) the slave device only, or (iii) both the master device and the slave device. Mirroring logic 32 is used to configure both devices 16A and 16B to be selected simultaneously. This allows the storing of data within devices 16A and 16B simultaneously (i.e., simultaneous writes to devices 16A and 16B). Mirroring logic 32 also logically combines corresponding ATA status signals from devices 16A and 16B and provides a resulting single set of ATA status signals to ATA controller 14.

When devices 16A and 16B are ATA disk drives, a RAID 1 disk mirroring data storage system may be established within computer system 30 wherein devices 16A and 16B form a mirrored pair of disk drives. Mirroring logic 32 facilitates the ability to perform simultaneous writes to devices 16A and 16B in order to avoid a write operation to the mirrored pair involving writing data to one disk drive of the mirrored pair (e.g., device 16A) and then writing the same data to the other disk drive of the mirrored pair (e.g., device 16B) as described above for conventional systems. With mirroring logic 32 and the ability to perform simultaneous writes to devices 16A and 16B, significant amounts of time may be saved during write operations to the mirrored pair, and the performance of the RAID 1 disk mirroring data storage system may be substantially increased.

Host 12 accesses devices 16A and 16B via ATA controller 14, ATA bus 18, and mirroring logic 32. ATA controller 14 and ATA bus 18 may conform to AT attachment (ATA) standard ANSI X3.221-1994, or any other ATA standard or variant thereof. As described above, the current ATA standards allow one or two devices to be coupled to host 12 via ATA controller 14 and ATA bus 18. It is noted that computer system 30 may include additional ATA controllers 14 and associated additional ATA buses 18, thus allowing more than two devices with ATA interfaces to be coupled to host 12.

ATA bus 18 includes data bus 20, control bus 22, and status bus 24 described above. Signal lines of data bus 20 are bi-directional signal lines which convey the ATA data signals (i.e., DD0–DD15) between ATA controller 14 and devices 16A and 16B. Signal lines of control bus 22 include address signal lines 22A and other control signal lines 22B. The other control signal lines 22B convey ATA control signals other than the ATA address signals (i.e., DIOR-, DIOW-, DMACK-, PDIAG-, and RESET-) from ATA controller 14 to devices 16A and 16B. The other control signal lines 22B also convey ATA control signals DIOR- and DIOW- to mirroring logic 32.

Address signal lines 22A convey ATA address signals (i.e., CS0-, CS1-, DA0, DA1, and DA2) from ATA controller 14 to mirroring logic 32. Mirroring logic 32 receives the ATA address signals. As described in more detail below, mirroring logic 32 is configurable to provides the ATA address signals to: (i) device 16A via address signal lines 34A, (ii) to device 16B via address signal lines 34B, or (iii) both device 16A and device 16B via respective address signal lines 34A and 34B. Mirroring logic is used to configure both devices 16A and 16B to be selected simultaneously for certain operations.

Mirroring logic 32 also receives a first set of ATA status signals (i.e., DMARQ, INTRQ, and IORDY) from device 16A via status signal lines 36A, and a second set of ATA status signals from device 16B via status signal lines 36B. Mirroring logic 32 produces a third set of ATA status signals dependent upon the first and seconds sets of ATA status signals. Signal lines of status bus 24 convey the third set of ATA status signals from mirroring logic 32 to ATA controller 14.

As described in more detail below, mirroring logic 32 is configurable to operate in one of various modes including a "normal mode" and a "simultaneous write mode". In both the normal mode and the simultaneous write modes, mirroring logic 32 provides ATA address signals from ATA controller 14 to both device 16A and device 16B. In the normal mode, mirroring logic 32 produces the third set of ATA status signals by connecting together corresponding ATA status signals of the first set of ATA status signals received from device 16A and the second set of ATA status signals received from device 16B. Thus in the normal mode, mirroring logic 32 produces the DMARQ signal of the third set of ATA status signals by connecting or wiring together the DMARQ signal received from device 16A with the DMARQ signal received from device 16B. In the normal mode, mirroring logic 32 produces the INTRQ signal of the third set of ATA status signals by connecting or wiring together the INTRQ signal received from device 16A with the INTRQ signal received from device 16B, and produces the IORDY signal of the third set of ATA status signals by connecting or wiring together the IORDY signal received from device 16A with the IORDY signal received from device 16B.

In the simultaneous write mode, mirroring logic 32 is configured to report a "ready" or "complete" status of devices 16A and 16B to ATA controller 14 only when both devices 16A and 16B have reported the "ready" or "complete" status. Thus in the simultaneous write mode, mirroring logic 32 produces the third set of ATA status by logically ANDing corresponding ATA status signals of the first set of ATA status signals received from device 16A and the second set of ATA status signals received from device 16B. In the simultaneous write mode, mirroring logic 32 produces the DMARQ signal of the third set of ATA status signals by logically ANDing the DMARQ signal received from device 16A with the DMARQ signal received from device 16B. In the simultaneous write mode, mirroring logic 32 produces the INTRQ signal of the third set of ATA status signals by logically ANDing the INTRQ signal received from device 16A with the INTRQ signal received from device 16B, and produces the IORDY signal of the third set of ATA status signals by logically ANDing the IORDY signal received from device 16A with the IORDY signal received from device 16B. The simultaneous write mode thus allows the host to properly respond to the status of both devices 16A and 16B. For example, both device 16A and device 16B must assert their respective DMARQ signals before the DMARQ signal of the third set will be asserted to indicate that DMA may now proceed.

Figure 3:
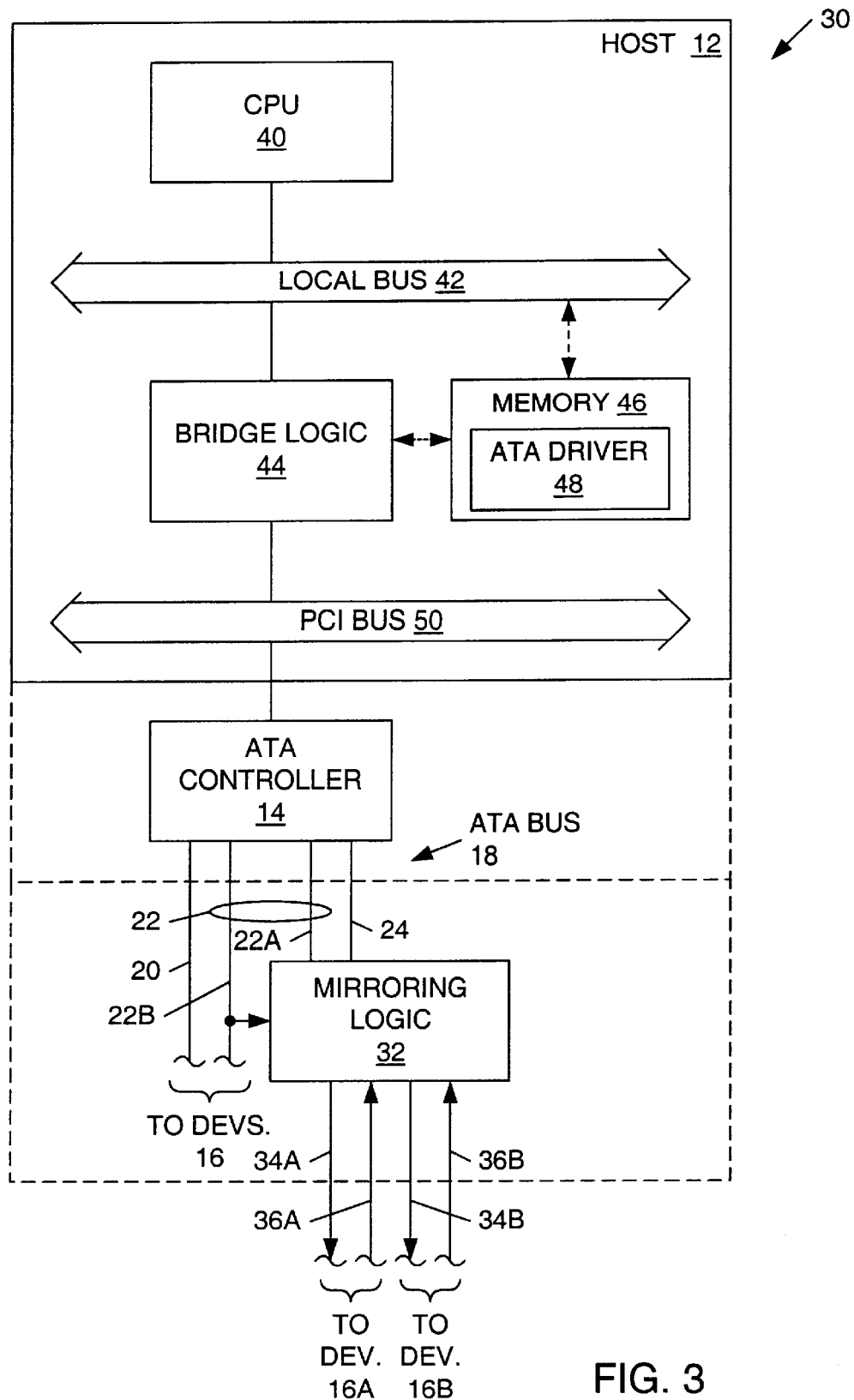
FIG. 3 is a diagram of an embodiment of the system of FIG. 2 wherein the host includes a peripheral bus, and wherein the ATA controller is coupled to the peripheral bus.

FIG. 3 is a diagram of an embodiment of computer system 30 of FIG. 2 wherein host 12 includes a central processing unit (CPU) 40, a local bus 42, bridge logic 44, a memory 46, and a peripheral component interconnect (PCI) bus 50. CPU 40 is coupled to local bus 42 and executes software instructions stored in memory 46. CPU 40 may be, for example, a microprocessor. Bridge logic 44 is coupled between local bus 42 and PCI bus 50, and controls the transfer of information (i.e., commands and/or data) between local bus 42 and PCI bus 50. As indicated in FIG. 3, memory 46 may be coupled to local bus 42. Alternately, bridge logic 44 may include a memory controller, and memory 46 may be coupled to bridge logic 44. In the embodiment of FIG. 3, ATA controller 14 is coupled to PCI bus 50.

An "enhanced" ATA driver 48 resides within memory 46 and includes software instructions. CPU 40 communicates with devices 16A and 16B via ATA controller 14 by executing the software instructions of ATA driver 48.

ATA driver 48 and mirroring logic 32 work together to accomplish simultaneous writes to device 16A and 16B. Such simultaneous writes may be carried out using two primary protocols of ATA data transfer: programmed input/output (PIO) techniques and direct memory access (DMA) techniques (e.g., multiword DMA as defined in the ATA/ATAPI-4 standard).

As indicated in FIG. 3, host 12 may include ATA controller 14, and may also include mirroring logic 32. Mirroring logic 32 may be formed upon a semiconductor substrate, and may be housed within an integrated circuit package forming an integrated circuit "chip". It is also noted that mirroring logic 32 may be incorporated within ATA controller 14. For example, ATA controller 14 and mirroring logic 32 may be formed upon the same semiconductor substrate, and may be housed within the same integrated circuit package forming an integrated circuit "chip".

The ATA interfaces of devices 16A and 16B include the standard ATA register set accessed using the ATA address signals CS0–, CS1–, DA0, DA1, and DA2. The standard ATA register set includes the ATA control block registers and the ATA command block registers. The ATA control block registers include the ATA alternate status register and the ATA device control register. The ATA command block registers include the ATA data register, the ATA features register, the ATA sector count register, the ATA sector number register, the ATA cylinder low register, the ATA cylinder high register, the ATA device/head register, the ATA status register, and the ATA command register.

Mirroring logic 32 is configured to enter one of several different modes in response to receiving a corresponding mode command on the ATA bus. Mirroring logic 32 performs different functions in each mode. Table 1 below lists modes of mirroring logic 32 and corresponding mode commands and mode functions. Table 2 below lists exemplary implementations of the mode commands of Table 1. It is noted that other implementations of the mode commands are possible and contemplated.

TABLE 1

Modes of Mirroring Logic 32
And Corresponding Mode Commands and Mode Functions.

| Mirroring Logic 32 Mode: | Mode Command: | Mode Functions: |
| --- | --- | --- |
| Master Connect | Master Connect | Disconnect address signal lines connected to slave device 1 from address signal lines 22A. |
| Slave Connect | Slave Connect | Disconnect address signal lines connected to master device 0 from address signal lines 22A. |
| Simultaneous Write | Simultaneous Write | Drive address signal lines connected to master device 0 and slave device 1 with values from address signal lines 22A. (Note 1) Drive status bus 24 with ATA status signals formed by logically ANDing corresponding ATA status signals received from master device 0 and slave device 1. |
| Normal | Normal | Drive address signal lines connected to master device 0 and slave device 1 with values from address signal lines 22A. Drive status bus 24 with ATA status signals formed by wiring together corresponding ATA status signals received from master device 0 and slave device 1. |

Note 1: Bits 7–5 of the value written to the cylinder high register during the final write operation indicate whether a PIO transfer or a multiword DMA transfer will take place. For example, bits 7–5=101 may indicate a PIO will take place, and bits 7–5=010 may indicate a multiword DMA transfer will take place.

TABLE 2

Exemplary Implementations
Of the Mode Commands of Mirroring Logic 32

| Mode Command: | Exemplary Implementation: |
| --- | --- |
| Master Connect | Three consecutive writes to the ATA features register. |
| Slave Connect | Three consecutive writes to the ATA device/control register. |
| Simultaneous Write | Three consecutive writes to the ATA cylinder high register. |
| Normal | Three consecutive writes to the ATA cylinder low register. |

The "master connect mode" and the "slave connect mode" are used to disconnect either device 16A or 16B from address signals lines 22A in order to configure devices 16A and 16B to be selected simultaneously. How this is accomplished in one embodiment is described in detail below. Receiving the "master connect" mode command (e.g., 3 consecutive writes to the ATA features register via ATA bus 18) causes mirroring logic 32 to operate in the master connect mode. As described above, either device 16A or device 16B is configured as the master device (i.e., master device 0), and the other device 16 is configured as the slave device (i.e., slave device 1). Mirroring logic 32 includes detection circuitry coupled to driver circuitry. The detection circuitry detects the master connect mode command, and signals the driver circuitry within mirroring logic 32 to disconnect address signal lines (i.e., address signal lines 34A or 34B) connected to slave device 1 from address signal lines 22A. (See Table 1 above.) Thus in the master connect mode, only master device 0 receives the address signals present upon address signal lines 22A so that only the master device 0 will respond to register accesses.

Receiving the "slave connect" mode command (e.g., 3 consecutive writes to the ATA device/control register via ATA bus 18) causes mirroring logic 32 to operate in the slave connect mode. The detection circuitry within mirroring logic 32 detects the slave connect mode command, and signals the driver circuitry within mirroring logic 32 to disconnect address signal lines (i.e., address signal lines 34A or 34B) connected to master device 0 from address signal lines 22A. (See Table 1 above.) Thus in the slave connect mode, only slave device 1 receives the address signals present upon address signal lines 22A so that only the slave device 1 will respond to register accesses.

Although the embodiment described above connects or disconnects the address signal lines to each device so that only one device will respond to register accesses, other mechanisms may be employed to achieve this functionality. For example, control signals other than the address lines may be connected or disconnected from the devices in the "master connect" and "slave connect" modes so that one of the devices will be temporarily "disconnected".

Receiving the "simultaneous write" mode command (e.g., 3 consecutive writes to the ATA cylinder high register via ATA bus 18) causes mirroring logic 32 to operate in the above described simultaneous write mode. The detection circuitry within mirroring logic 32 detects the simultaneous write mode command, and signals the driver circuitry within mirroring logic 32 to drive address signal lines connected to both master device 0 and slave device 1 (i.e., address signal lines 34A and 34B) with values received from ATA controller 14 via address signal lines 22A.

In the simultaneous write mode, status signal generation circuitry within mirroring logic 32 receives a first set of ATA status signals from master device 0 and a second set of ATA status signals from slave device 1. The status signal generation circuitry logically ANDing corresponding status signals of the first and second sets to form a third set of ATA status signals as described above. Signal lines of status bus 24 are driven with the third set of ATA status signals produced by the status signal generation circuitry.

In one embodiment, bits 7–5 of the value written to the cylinder high register during the final of the three write operations are used to indicate whether a PIO transfer or a multiword DMA transfer will take place. For example, as indicated in Note 1 of Table 1 above, bits 7–5=101 indicate a PIO will take place, and bits 7–5=010 indicate a multiword DMA transfer will take place.

Receiving the "normal" mode command (e.g., 3 consecutive writes to the ATA cylinder low register via ATA bus 18) causes mirroring logic 32 to operate in the above described normal mode. The detection circuitry within mirroring logic 32 detects the normal mode command, and signals the driver circuitry to drive address signal lines connected to master device 0 and slave device 1 (i.e., address signal lines 34A and 34B) with values received from ATA controller 14 via address signal lines 22A.

In the normal mode, the status signal generation circuitry within mirroring logic 32 receives the first set of ATA status signals from master device 0 and the second set of ATA status signals from slave device 1. The status signal generation circuitry connects or wires together corresponding status signals of the first and second sets to form the third set of ATA status signals as described above. Signal lines of status bus 24 are driven with the third set of ATA status signals produced by the status signal generation circuitry. Thus in the normal mode, devices 16A and 16B are coupled to ATA controller 14 via mirroring logic 32 in conventional ATA fashion.

Figure 4:
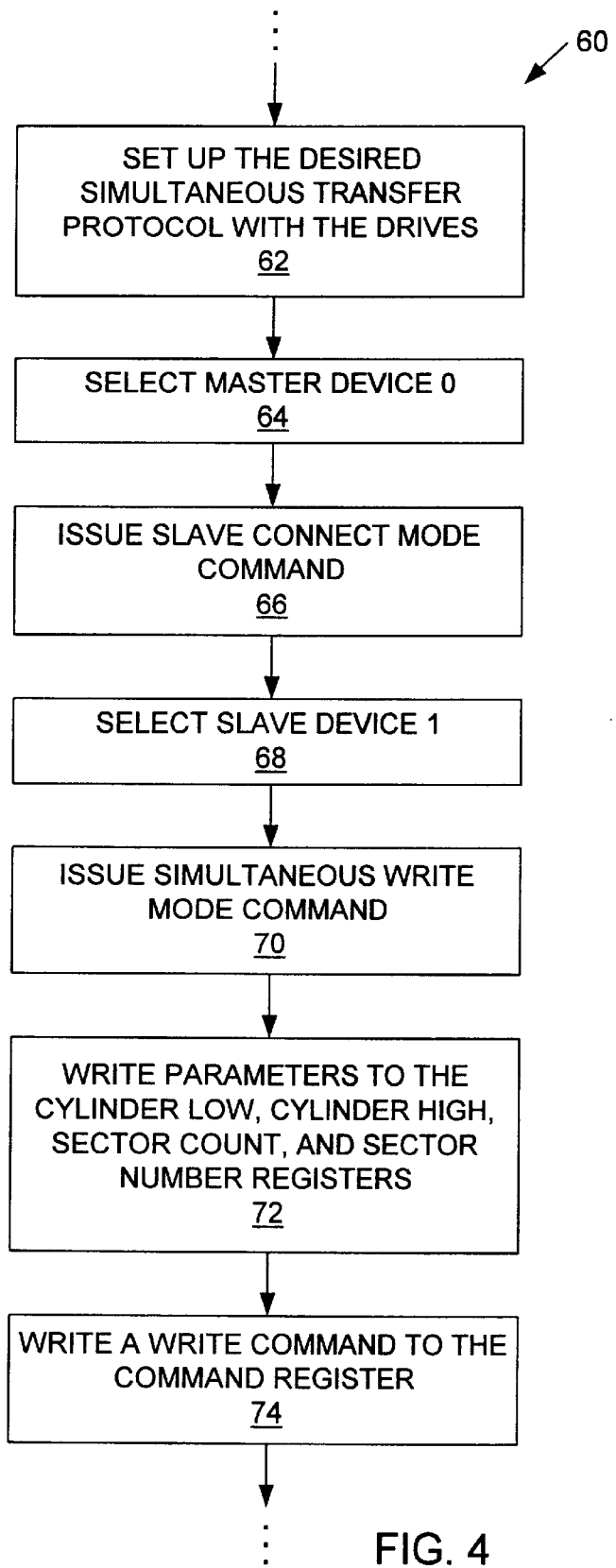
FIG. 4 is a flow chart of one embodiment of a setup portion of a method for writing to the two devices of FIGS. 2–3 simultaneously.

FIG. 4 is a flow chart of one embodiment of a setup portion 60 of a method for writing to devices 16A and 16B of FIGS. 2–3 simultaneously (e.g., causing devices 16A and 16B of FIGS. 2–3 to perform a mirrored write operation simultaneously). In one embodiment, the method for writing to devices 16A and 16B simultaneously may be embodied within ATA driver 48 (FIG. 3), and the following description of setup portion 60 will be presented accordingly. During 62 of setup portion 60, ATA driver 48 (FIG. 3) sets up the desired simultaneous transfer protocol with the drives. For example, if a multiword DMA write is desired, ATA driver 48 may issue a SET FEATURE command to both drives, following the standard ATA protocol. This action selects multiword DMA and deselects any Ultra DMA modes.

As described above, either device 16A or device 16B is configured as master device 0, and the other device 16 is configured as slave device 1. During 64, ATA driver 48 selects master device 0. In conventional ATA fashion, ATA driver 48 may write a value to the ATA device/head register with DEV bit 4=0, thereby selecting master device 0. At this point, the driver circuitry within mirroring logic 32 drives address signal lines 34A and 34B with values received from ATA controller 14 via address signal lines 22A. Both master device 0 and slave drive 1 may receive the value with DEV bit 4=0 and store the value in their respective device/head registers to indicate that master device 0 is selected.

During 66, ATA driver 48 issues the slave connect mode command to mirroring logic 32 (e.g., by performing 3 consecutive writes to the device/control register). The detection circuitry within mirroring logic 32 detects the slave connect mode command, and signals the driver circuitry within mirroring logic 32 to disconnect address signal lines (i.e., address signal lines 34A or 34B) connected to master device 0 from address signal lines 22A. (See Table 1 above.) As a result, only slave device 1 receives the address signals present upon address signal lines 22A.

During 68, ATA driver 48 selects slave device 1. In conventional ATA fashion, ATA driver 48 may write a value to the ATA device/head register with DEV bit 4=1, thereby selecting slave device 1. At this point, the driver circuitry within mirroring logic 32 drives only the address signal lines (i.e., address signal lines 34A or 34B) connected to slave device 1 with values received from ATA controller 14 via address signal lines 22A. Only slave drive 1 receives the value with DEV bit 4=1 and stores the value in the device/head register.

Following 68, both master device 0 and slave device 1 are selected. For example, the device/head register of master device 0 may have a value with DEV bit 4=0 stored therein, and the device/head register of slave device 1 may have a value with DEV bit 4=1 stored therein. In this situation both master device 0 and slave device 1 are selected simultaneously.

During 70, ATA driver 48 issues the simultaneous write mode command to mirroring logic 32 (e.g., by performing 3 consecutive writes to the ATA cylinder high register). The detection circuitry within mirroring logic 32 detects the simultaneous write mode command, and signals the driver circuitry within mirroring logic 32 to drive address signal lines connected to master device 0 and slave device 1 (i.e., address signal lines 34A and 34B) with values received from ATA controller 14 via address signal lines 22A.

In addition, status signal generation circuitry within mirroring logic 32 receives a first set of ATA status signals from master device 0 and a second set of ATA status signals from slave device 1. The status signal generation circuitry logically ANDing corresponding status signals of the first and second sets to form a third set of ATA status signals as described above. Signal lines of status bus 24 are driven with the third set of ATA status signals produced by the status signal generation circuitry.

In one embodiment, bits 7–5 of the value written to the cylinder high register during the final write operation of 70 are used to indicate whether a PIO transfer or a multiword DMA transfer will take place. For example, as indicated in Note 1 of Table 1 above, bits 7–5=101 indicate a PIO will take place, and bits 7–5=010 indicate a multiword DMA transfer will take place.

During 72, ATA driver 48 loads ATA registers of master device 0 and slave device 1 with write parameters. For example, ATA driver 48 writes the parameters to the following ATA registers: cylinder low, cylinder high, sector count, and sector number, as in preparation for a normal ATA write operation. As both master device 0 and slave device 1 receive address signals driven upon address signal lines 22A, both master device 0 and slave device 1 receive and store the write parameters.

During 74, ATA driver 48 writes a write command to the command register (e.g., the ATA command register). Exemplary write commands include the ATA WRITE SECTOR, WRITE MULTIPLE, and WRITE DMA commands. As both master device 0 and slave device 1 receive address signals driven upon address signal lines 22A, both master device 0 and slave device 1 receive the write command and store the write command in respective command registers. As both master device 0 and slave device 1 are selected both master device 0 and slave device 1 carry out the command.

Figure 5A:
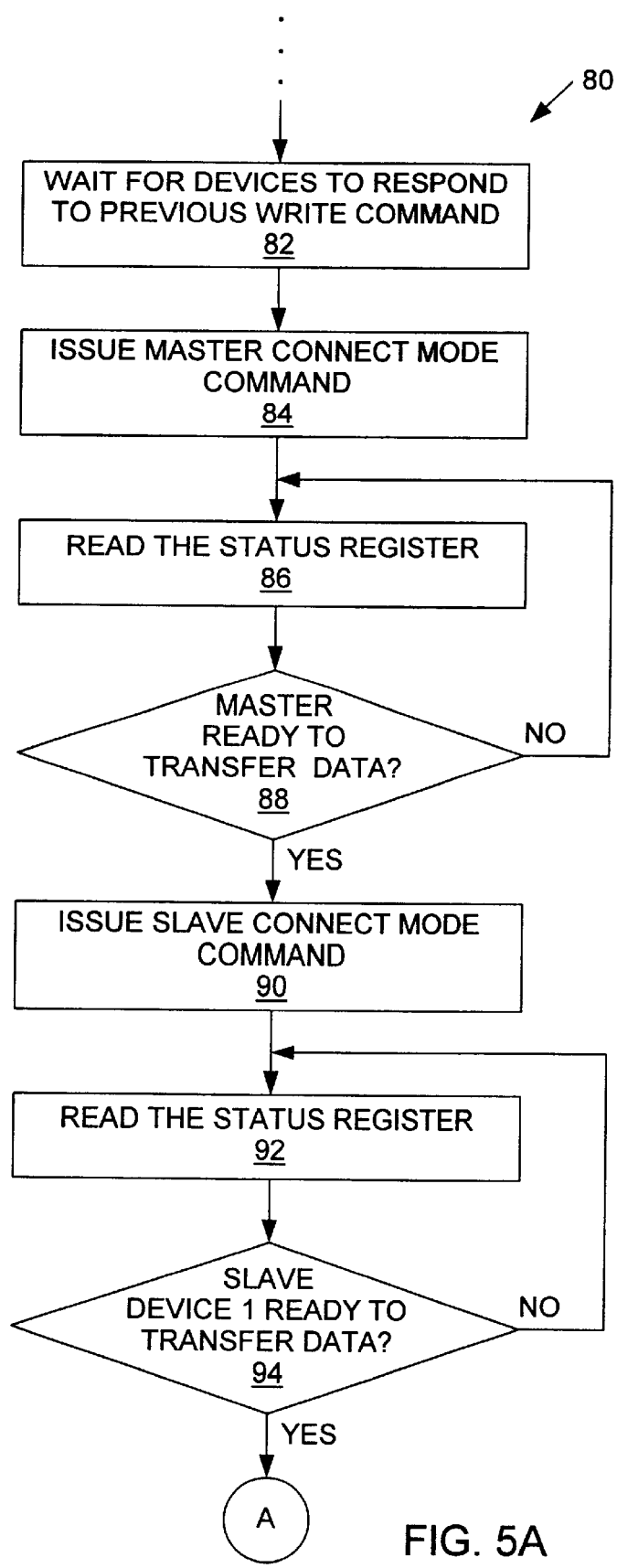
FIGS. 5A–5C in combination form a flow chart of one embodiment of a programmed input/output (PIO) portion of the method for writing to the two devices of FIGS. 2–3 simultaneously.
Figure 5B:
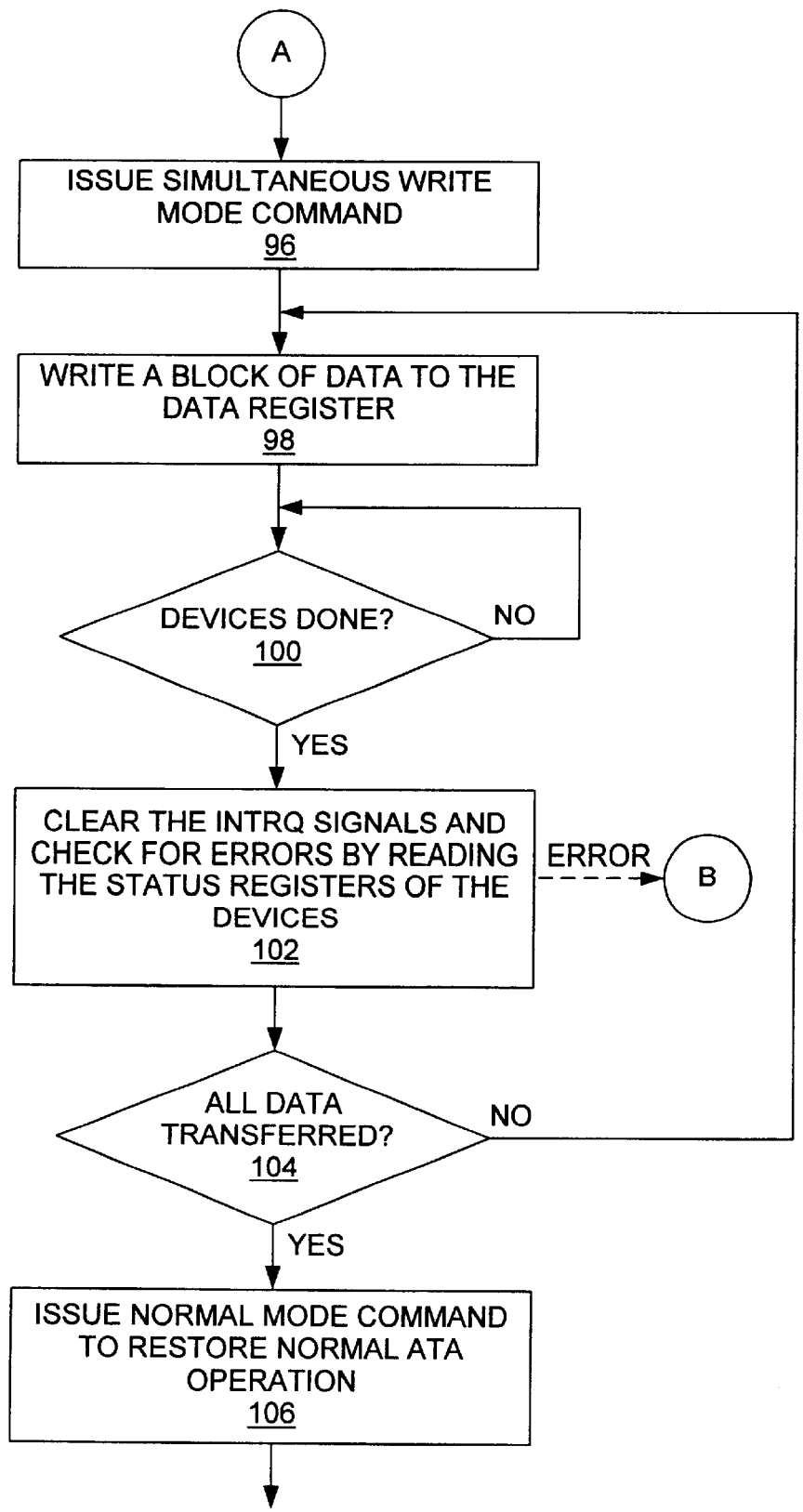
Figure 5C:
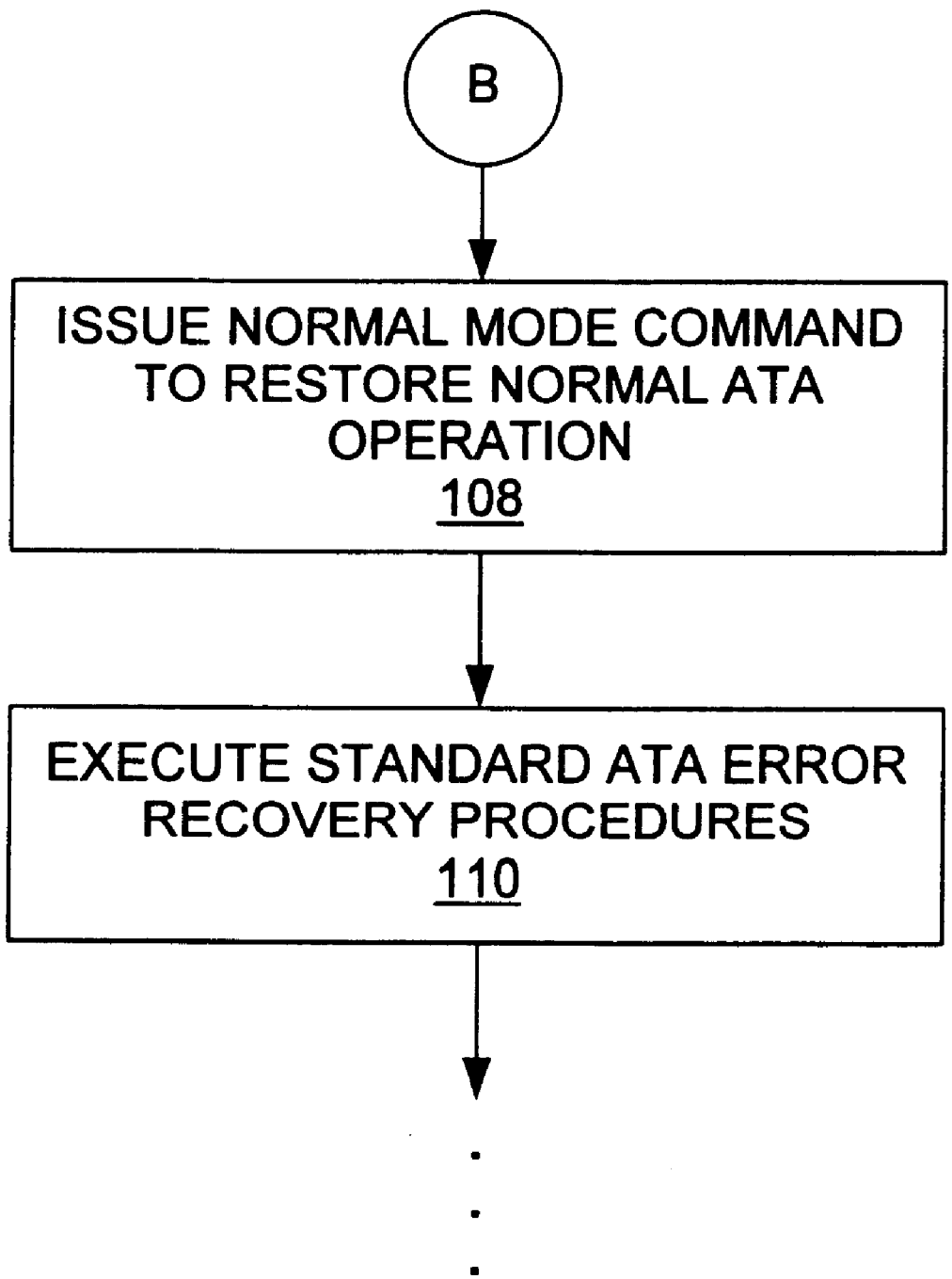

FIGS. 5A–5C in combination form a flow chart of one embodiment of a programmed input/output (PIO) portion 80 of the method for writing to devices 16A and 16B of FIGS. 2–3 simultaneously, wherein PIO portion 80 may follow setup portion 60 of FIG. 4 if a PIO simultaneous transfer is desired. As described above, a method for writing to devices 16A and 16B simultaneously may be embodied within ATA driver 48 (FIG. 3), and the following description of PIO portion 80 will be presented accordingly.

As described above, either device 16A or device 16B is configured as master device 0, and the other device 16 is configured as slave device 1. Prior to 82, both master device 0 and slave device 1 are selected, and mirroring logic 32 is in the simultaneous write mode. During 82 of PIO portion 80, ATA driver 48 waits for master device 0 and slave device 1 to respond to a previous write command (e.g., an ATA write command written to the ATA command registers of master device 0 and slave device 1 during 74 of the above described setup portion 60). During 82, ATA driver 48 may wait, for example, a maximum amount of time (e.g., 400 nanoseconds) allowed by ATA standards for master device 0 and slave device 1 to set the busy (BSY) bit 7 of the status register in response to the writing of the ATA write command to the ATA command register.

During 84, ATA driver 48 issues the master connect mode command to mirroring logic 32 (e.g., by performing 3 consecutive writes to the features register). The detection circuitry within mirroring logic 32 detects the master connect mode command, and signals the driver circuitry within mirroring logic 32 to disconnect address signal lines (i.e., address signal lines 34A or 34B) connected to slave device 1 from address signal lines 22A. (See Table 1 above.) As a result, only master device 0 receives the address signals present upon address signal lines 22A.

During 86, ATA driver 48 reads the status register. As only master device 0 receives the address signals present upon address signal lines 22A, ATA driver 48 reads the status register of master device 0 during 86. During 88, ATA driver 48 tests the value read from the status register of master device 0 during 86 to determine if master device 0 is ready to transfer data. For example, according to ATA standards, if BSY bit 7=0 and the data request (DRQ) bit 3=1, master device 0 is ready to transfer data. In this situation, 90 is performed next. On the other hand, if BSY bit 7=1 or DRQ bit 3=0, master device 0 is not ready to transfer data. In this situation, 86 and 88 are repeated until master device 0 is ready to transfer data.

During 90, ATA driver 48 issues the slave connect mode command to mirroring logic 32 (e.g., by performing 3 consecutive writes to the device/control register). The detection circuitry within mirroring logic 32 detects the slave connect mode command, and signals the driver circuitry within mirroring logic 32 to disconnect address signal lines (i.e., address signal lines 34A or 34B) connected to master device 0 from address signal lines 22A. (See Table 1 above.) As a result, only slave device 1 receives the address signals present upon address signal lines 22A.

During 92, ATA driver 48 reads the status register. As only slave device 1 receives the address signals present upon address signal lines 22A, ATA driver 48 reads the status register of slave device 1 during 92. During 94, ATA driver 48 tests the value read from the status register of slave device 1 during 92 to determine if slave device 1 is ready to transfer data. For example, according to ATA standards, if BSY bit 7=0 and DRQ bit 3=1, slave device 1 is ready to transfer data. In this situation, 96 is performed next. On the other hand, if BSY bit 7=1 or DRQ bit 3=0, slave device 1 is not ready to transfer data. In this situation, 92 and 94 are repeated until slave device 1 is ready to transfer data.

During 96, ATA driver 48 issues the simultaneous write mode command to mirroring logic 32 (e.g., by performing 3 consecutive writes to the ATA cylinder high register). The detection circuitry within mirroring logic 32 detects the simultaneous write mode command, and signals the driver circuitry within mirroring logic 32 to drive address signal lines connected to master device 0 and slave device 1 (i.e., address signal lines 34A and 34B) with values received from ATA controller 14 via address signal lines 22A.

In addition, the status signal generation circuitry within mirroring logic 32 receives the first set of ATA status signals from master device 0 and the second set of ATA status signals from slave device 1. The status signal generation circuitry logically ANDing corresponding status signals of the first and second sets to form the third set of ATA status signals as described above. Signal lines of status bus 24 are driven with the third set of ATA status signals produced by the status signal generation circuitry.

During 98, ATA driver 48 writes a block of data to the ATA data registers of master device 0 and slave device 1. Both master device 0 and slave device 1 store the write data dependent upon the write parameters and the write command. As the status signal generation circuitry of mirroring logic 32 logically ANDs the corresponding IORDY status signals from master device 0 and slave device 1 to produce the IORDY signal provided to ATA controller 14: (i) either master device 0 or slave device 1 may suspend the transfer by deasserting the IORDY signal, and (ii) once suspended, the transfer does not resume until both devices assert the IORDY signal.

When one of the devices completes the transfer, the device asserts the INTRQ signal. As the status signal generation circuitry within mirroring logic 32 produces the INTRQ signal provided to ATA controller 14 as the logical AND of the INTRQ signals from master device 0 and slave device 1, mirroring logic 32 does not assert the INTRQ signal provided to ATA controller 14 until both master device 0 and slave device 1 have completed the block data transfer.

During 100, ATA driver 48 tests the value of the INTRQ signal received by ATA controller 14 from mirroring logic 32 to determine if both master device 0 and slave device 1 have completed the block data transfer. If the INTRQ signal is asserted, both master device 0 and slave device 1 have completed the block data transfer, and 102 is performed next. On the other hand, if the INTRQ signal is not asserted, master device 0 and/or slave device 1 has not completed the block data transfer. In this situation, 100 is repeated until both master device 0 and slave device 1 have completed the block data transfer.

Figure 6:
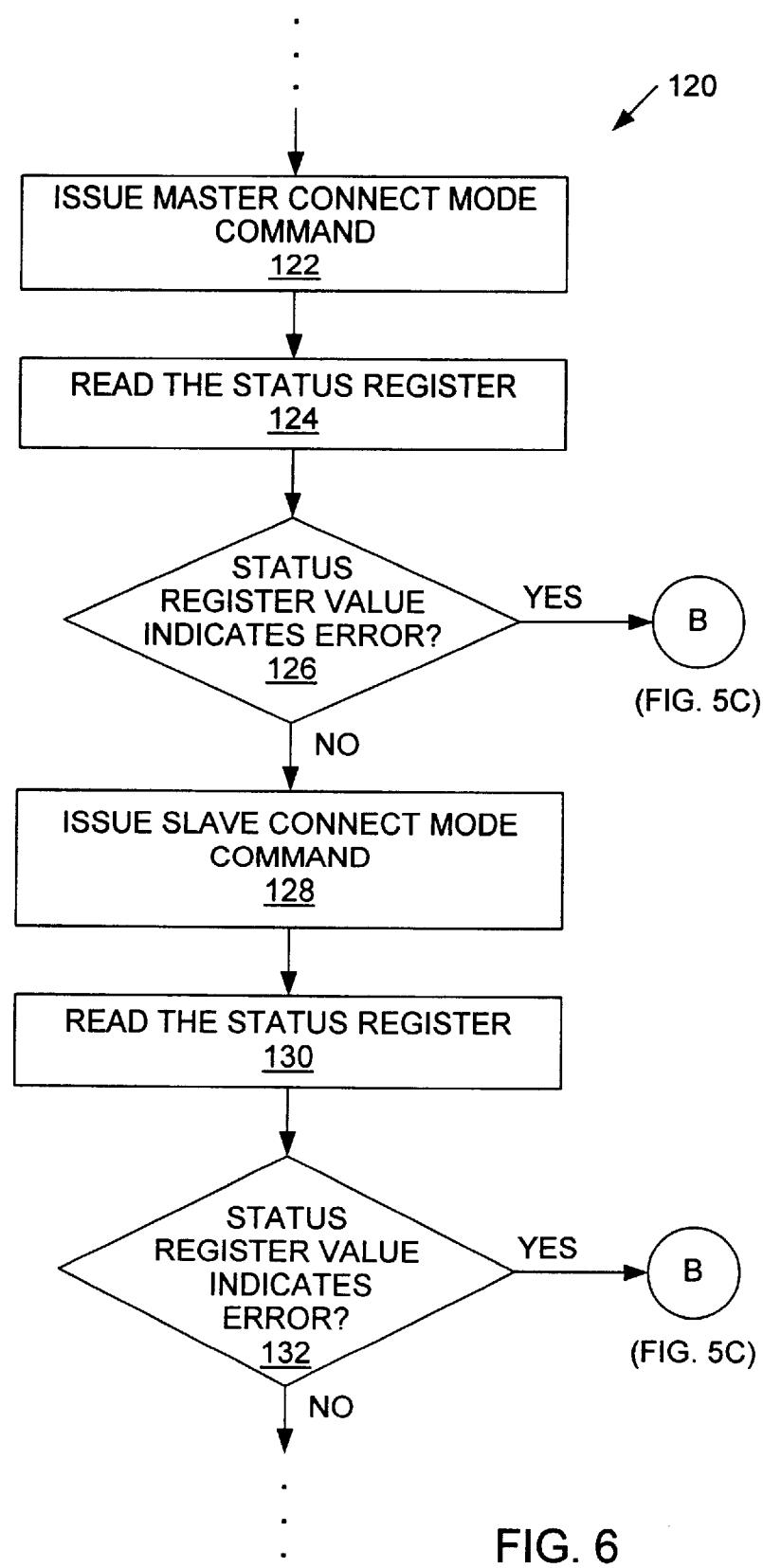
FIG. 6 is a flow chart of one embodiment of a method for clearing interrupt signals set by the two devices of FIGS. 2–3 and checking for errors during a simultaneous write operation.

During 102, ATA driver 48 clears the INTRQ signals of master device 0 and slave device 1 by reading the status registers of each device in sequence. (A method for performing this procedure is shown in FIG. 6 and described in detail below.) ATA driver 48 checks the status register values to see if master device 0 and/or slave device 1 indicted an error occurred during the block data transfer. As described below, if an error occurred during the block data transfer, ATA driver 48 may abort the write operation, and 108 may be performed next.

During 104, if all data blocks have not been transferred, 98, 100, and 102 are repeated until all data blocks are transferred. Once all data blocks have been transferred, 106 is next performed.

During 106, ATA driver 48 issues the normal mode command to mirroring logic 32 (e.g., by performing 3 consecutive writes to the ATA cylinder low register) in order to restore normal ATA operation. The detection circuitry within mirroring logic 32 detects the normal mode command, and signals the driver circuitry within mirroring logic 32 to drive address signal lines connected to master device 0 and slave device 1 (i.e., address signal lines 34A and 34B) with values received from ATA controller 14 via address signal lines 22A.

In addition, the status signal generation circuitry within mirroring logic 32 receives the first set of ATA status signals from master device 0 and the second set of ATA status signals from slave device 1. The status signal generation circuitry connects corresponding status signals of the first and second sets to form the third set of ATA status signals as described above. Signal lines of status bus 24 are driven with the third set of ATA status signals produced by the status signal generation circuitry.

During 108 in the case of error, ATA driver 48 issues the normal mode command to mirroring logic 32 (e.g., by performing 3 consecutive writes to the ATA cylinder low register) in order to restore normal ATA operation. (See 106 above.) During 110, ATA driver 48 executes a standard ATA error recovery procedure.

FIG. 6 is a flow chart of one embodiment of a method 120 for clearing interrupt signals (e.g., ATA INTRQ signals) set by devices 16A and 16B of FIGS. 2–3 and checking for errors during a simultaneous write operation. Method 120 may be used to perform 102 of PIO portion 80 (FIGS. 5A–5C) of the above described method for simultaneously writing to devices 16A and 16B. As described above, the method for writing to devices 16A and 16B simultaneously is preferably embodied within ATA driver 48 (FIG. 3), and the following description of method 120 will be presented accordingly.

As described above, one of the devices 16A and 16B is configured as master device 0, and the other device 16 is configured as slave device 1. During 122, ATA driver 48 issues the master connect mode command to mirroring logic 32 (e.g., by performing 3 consecutive writes to the features register). The detection circuitry within mirroring logic 32 detects the master connect mode command, and signals the driver circuitry within mirroring logic 32 to disconnect address signal lines (i.e., address signal lines 34A or 34B) connected to slave device 1 from address signal lines 22A. (See Table 1 above.) As a result, only master device 0 receives the address signals present upon address signal lines 22A.

During 124, ATA driver 48 reads the status register. As only master device 0 receives the address signals present upon address signal lines 22A, ATA driver 48 reads the status register of master device 0 during 124. The reading of the status register of master device 0 causes master device 0 to deassert the INTRQ signal.

During 126, ATA driver 48 tests the status register value obtained from master device 0 during 124. If the status register value indicates an error, ATA driver 48 aborts the simultaneous write operation, and 108 of PIO portion 80 (FIGS. 5A–5C) described above is performed next. During 108, ATA driver 48 issues the normal mode command to mirroring logic 32 (e.g., by performing 3 consecutive writes to the ATA cylinder low register) in order to restore normal ATA operation. Following 108, 110 of PIO portion 80 is performed, resulting in ATA driver 48 executing a standard ATA error recovery procedure as described above. If, on the other hand, the status register value does not indicate an error in 124, 128 is performed next.

During 128, ATA driver 48 issues the slave connect mode command to mirroring logic 32 (e.g., by performing 3 consecutive writes to the device/control register). The detection circuitry within mirroring logic 32 detects the slave connect mode command, and signals the driver circuitry within mirroring logic 32 to disconnect address signal lines (i.e., address signal lines 34A or 34B) connected to master device 0 from address signal lines 22A. (See Table 1 above.) As a result, only slave device 1 receives the address signals present upon address signal lines 22A.

During 130, ATA driver 48 reads the status register. As only slave device 1 receives the address signals present upon address signal lines 22A, ATA driver 48 reads the status register of slave device 1 during 130. The reading of the status register of slave device 1 causes slave device 1 to deassert the INTRQ signal.

During 132, ATA driver 48 tests the status register value obtained from slave device 1 during 130. If the status register value indicates an error, ATA driver 48 aborts the simultaneous write operation, and 108 of PIO portion 80 described above is performed next. (See 126 above.) If, on the other hand, the status register value does not indicate an error in 124, method 120 is complete.

A multiword DMA simultaneous transfer protocol will now be described. If a multiword DMA simultaneous transfer is indicted (e.g., via bits 7–5 of the value written to the cylinder high register during the final write operation of 70 of setup portion 60 of FIGS. 4A–4B), master drive 0 and slave drive 1 will assert DMARQ signals when ready to transfer data.

During 70 of setup portion 60, ATA driver 48 issued the simultaneous write mode command to mirroring logic 32 (e.g., by performing 3 consecutive writes to the ATA cylinder high register). The detection circuitry within mirroring logic 32 detected the simultaneous write mode command, and signaled the driver circuitry within mirroring logic 32 to drive address signal lines connected to master device 0 and slave device 1 (i.e., address signal lines 34A and 34B) with values received from ATA controller 14 via address signal lines 22A.

In addition, status signal generation circuitry within mirroring logic 32 was configured to receive a first set of ATA status signals from master device 0 and a second set of ATA status signals from slave device 1, and to logically ANDing corresponding status signals of the first and second sets to form a third set of ATA status signals as described above. Signal lines of status bus 24 are driven with the third set of ATA status signals produced by the status signal generation circuitry.

As the status signal generation circuitry within mirroring logic 32 produces the DMARQ signal provided to ATA controller 14 as the logical AND of the DMARQ signals from master device 0 and slave device 1, mirroring logic 32 does not assert the DMARQ signal provided to ATA controller 14 until the DMARQ signals from master device 0 and slave device 1 are both asserted (i.e., both master device 0 and slave device 1 are ready to transfer data).

When a given device completes the multiword DMA transfer, the device asserts the INTRQ signal. As the status signal generation circuitry within mirroring logic 32 produces the INTRQ signal provided to ATA controller 14 as the logical AND of the INTRQ signals from master device 0 and slave device 1, mirroring logic 32 does not assert the INTRQ signal provided to ATA controller 14 until both master device 0 and slave device 1 have completed the multiword DMA transfer.

When ATA controller 14 receives the INTRQ signal from mirroring logic 32, ATA driver 48 clears the INTRQ signals of master device 0 and slave device 1 and checks for errors during the multiword DMA transfer (e.g., using method 120 of FIG. 6). If a status register value indicates an error, ATA driver 48 issues the normal mode command to mirroring logic 32 (e.g., by performing 3 consecutive writes to the ATA cylinder low register) in order to restore normal ATA operation (e.g., 108 of PIO portion 80 of FIGS. 5A–5C). ATA driver 48 then executes a standard ATA error recovery procedure (e.g., 110 of PIO portion 80). If, on the other hand, the status register values do not indicate an error, the multiword DMA transfer is complete.

Numerous variations and modifications will become apparent to those skilled in the art once the above disclosure is fully appreciated. It is intended that the following claims be interpreted to embrace all such variations and modifications.

What is claimed is:

1. A circuit, comprising:
   mirroring logic configured to couple to a host controller, a first device, and a second device, wherein each of the first and second devices comprises a plurality of registers; and
   wherein the mirroring logic is configurable to operate in:
      a first connect mode wherein the mirroring logic allows the registers of the first device to be accessed from the host controller and prevents the registers of the second device from being accessed from the host controller when the first and second devices are both active on the same communication channel; and
      a second connect mode wherein the mirroring logic allows the registers of the second device to be accessed from the host controller and prevents the registers of the first device from being accessed from the host controller when the first and second devices are both active on the same communication channel; and
      a third connect mode wherein the mirroring logic allows the registers of both the first device and second device to be accessed from the host controller;
   wherein the mirroring logic is configured to switch between said first, second and third connect modes in response to mode commands from the host controller.

2. The circuit as recited in claim 1, wherein the first and second devices are data storage devices.

3. The circuit as recited in claim 1, wherein the registers of the first and second devices are accessed via a plurality of control signals produced by the controller, and wherein the mirroring logic is coupled to receive a portion of the control signals and configured to selectively provide the portion of the control signals to the first and second devices.

4. The circuit as recited in claim 3, wherein in the first connect mode the mirroring logic provides the portion of the control signals to only the first device such that the registers of only the first device are accessed, and wherein in the second connect mode the mirroring logic provides the portion of the control signals to only the second device such that the registers of only the second device are accessed.

5. The circuit as recited in claim 4, wherein each of the first and second devices includes an AT Attachment (ATA) interface conforming to an ATA standard.

6. The circuit as recited in claim 5, wherein the control signals include ATA control signals, and wherein each of the first and second devices is configurable to be selected in response to register accesses via the ATA control signals, and wherein the first and second devices carry out received commands only when selected.

7. The circuit as recited in claim 6, wherein the ATA control signals include a plurality of ATA address signals, and wherein in the first connect mode the mirroring logic provides the ATA address signals to only the first device, and wherein in the second connect mode the mirroring logic provides the ATA address signals to only the second device.

8. The circuit as recited in claim 7, wherein each of the first and second devices is configurable to be selected dependent upon the ATA address signals.

9. The circuit as recited in claim 8, wherein the ATA address signals comprise a chip select 0 (CS0) signal, a chip select 1 (CS1), a device address bit 0 (DA0) signal, a device address bit 1 (DA1) signal, and a device address bit 2 (DA2) signal, and wherein the CS0 and CS1 signals are active low, and wherein the DA0, DA1, and DA2 signals are active high.

10. The circuit as recited in claim 1, wherein the mirroring logic is coupled to receive a first plurality of status signals from the first device and a second plurality of status signals from the second device, and wherein the mirroring logic is configured to produce a third plurality of status signals dependent upon the first and second pluralities of status signals.

11. The circuit as recited in claim 10, wherein the third connect mode is a simultaneous write mode, and wherein in the simultaneous write mode the mirroring logic is configured to: (i) provide all of the control signals to both the first and second devices, and (ii) produce the third plurality of status signals by logically ANDing corresponding status signals of the first and second pluralities of status signals.

12. The circuit as recited in claim 11, wherein the first, second, and third pluralities of status signals comprise ATA status signals including a direct memory access request (DMARQ) signal, an interrupt request (INTRQ) signal, and an input/output ready (IORDY) signal, and wherein the DMARQ, INTRQ, and IORDY signals are active high.

13. The circuit as recited in claim 10, wherein the third connect mode is a normal mode, and wherein in the normal mode the mirroring logic is configured to: (i) provide all of the control signals to both the first and second devices, and (ii) produce the third plurality of status signals by wiring together corresponding status signals of the first and second pluralities of status signals.

14. The circuit as recited in claim 13, wherein the first, second, and third pluralities of status signals comprise ATA status including a direct memory access request (DMARQ) signal, an interrupt request (INTRQ) signal, and an input/output ready (IORDY) signal, and wherein the DMARQ, INTRQ, and IORDY signals are active high.

15. A system, comprising:
   a host controller configured to produce a plurality of control signals;
   a first device and a second device accessible on the same communication channel, wherein each of the first and second devices comprise a plurality of registers accessed via the control signals; and
   mirroring logic coupled to the first and second devices and to receive a portion of the control signals, wherein the mirroring logic is configurable to provide the portion of the control signals to: (i) only the first device in a first mode so that the registers of the second device are not accessed, (ii) only the second device in a second mode so that the registers of the first device are not accessed, and (iii) both the first and second devices in a third mode so that the registers of both the first and second devices are accessed, wherein the mirroring logic is configured to switch between said first, second and third modes in response to mode commands from the host controller.

16. The system as recited in claim 15, wherein the first and second devices are data storage devices.

17. The system as recited in claim 15, wherein the mirroring logic is configured to allow both the first and second devices to be selected simultaneously.

18. The system as recited in claim 15, wherein the first and second devices have AT Attachment (ATA) interfaces conforming to an AT standard, and wherein the control signals are ATA control signals.

19. The system as recited in claim 18, wherein the AT control signals include a plurality of ATA address signals, and wherein the mirroring logic is configurable to provide the ATA address signals to: (i) only the first device in the first mode so that the registers of the second device are not accessed, (ii) only the second device in the second mode so that the registers of the first device are not accessed, and (iii) both the first and second devices in the third mode so that the registers of both the first and second devices are accessed.

20. The system as recited in claim 19, wherein the first and second devices are configurable to be selected dependent upon the ATA address signals, and wherein the first and second devices carry out received commands only when selected.

21. The system as recited in claim 15, wherein the mirroring logic is coupled to receive a first plurality of status signals from the first device and a second plurality of status signals from the second device, and wherein the mirroring logic is configured to produce a third plurality of status signals dependent upon the first and second pluralities of status signals.

22. The system as recited in claim 21, wherein the third mode is a normal mode and in the normal mode the mirroring logic is configure to produce the third plurality of status signals by wiring together corresponding status signals of the first and second pluralities of status signals.

23. The system as recited in claim 21, wherein the third mode is a simultaneous write mode and in the simultaneous write mode the mirroring logic is configured to produce the third plurality of status signals by logically ANDing corresponding status signals of the first and second pluralities of status signals.

24. A system, comprising:
  a pair of devices each having an AT Attachment (ATA) interface conforming to an ATA standard, wherein one of the pair of devices is configured as an ATA master device and the other device is configured as an ATA slave device on the same ATA channel; and
  mirroring logic coupled to the pair of devices and to receive a plurality of ATA control signals, wherein the ATA control signals include a plurality of ATA address signals, and wherein the mirroring logic is configurable to operate in one of a plurality of modes comprising:
    a first connect mode wherein the mirroring logic provides the ATA address signals to only the ATA master device;
    a second connect mode wherein the mirroring logic provides the ATA address signals to only the ATA slave device; and
    a third connect mode wherein the mirroring logic provides the ATA address signals to both the ATA master device an the ATA slave device to concurrently address both the ATA master device and the ATA slave device.

25. The system as recited in claim 24, wherein each of the pair of devices is a hard disk drive.

26. The system as recited in claim 24, wherein the mirroring logic is configured to allow both the first and second devices to be selected simultaneously.

27. The system as recited in claim 24, wherein each of the pair of devices is configurable to be selected dependent upon the ATA address signals, and wherein a selected one of the pair of device carries out received commands.

28. The system as recited in claim 24, wherein the AT address signals comprise a chip select 0 (CS0) signal, a chip select 1 (CS1), a device address bit 0 (DA0) signal, a device address bit 1 (DA1) signal, and a device address bit 2 (DA2) signal, and wherein the CS0 and CS1 signals are active low, and wherein the DA0, DA1, and DA2 signals are active high.

29. The system as recited in claim 24, wherein the mirroring logic is configured to enter the first connect mode in response to receiving three consecutive writes to the ATA features register.

30. The system as recited in claim 24, wherein the mirroring logic is configured to enter the second connect mode in response to receiving three consecutive writes to the ATA device/control register.

31. The system as recited in claim 24, wherein the mirroring logic is coupled to receive a first plurality of ATA status signals from the master device and a second plurality of ATA status signals from the slave device, and wherein the mirroring logic is configured to produce a third plurality of ATA status signals dependent upon the first and second pluralities of ATA status signals.

32. The system as recited in claim 31, wherein the third connect mode is a normal mode, and wherein in the normal mode the mirroring logic: (i) provides the ATA address signals to both the master and slave devices, and (ii) produces the third plurality of ATA status signals by wiring together corresponding ATA status signals of the first and second pluralities of ATA status signals.

33. The system as recited in claim 32, wherein the first, second, and third pluralities of ATA status signals comprise a direct memory access request (DMARQ) signal, an interrupt request (INTRQ) signal, and an input/output ready (IORDY) signal, and wherein the DMARQ, INTRQ, and IORDY signals are active high.

34. The system as recited in claim 32, wherein the mirroring logic is configured to enter the normal mode in response to receiving three consecutive writes to the ATA cylinder low register.

35. The system as recited in claim 31, wherein the third connect mode is a simultaneous write mode, and wherein in the simultaneous write mode the mirroring logic: (i) provides the ATA address signals to both the master and slave devices, and (ii) produces the third plurality of ATA status signals by logically ANDing corresponding ATA status signals of the first and second pluralities of ATA status signals.

36. The system as recited in claim 35, wherein the first, second, and third pluralities of ATA status signals comprise a direct memory access request (DMARQ) signal, an interrupt request (INTRQ) signal, and an input/output ready (IORDY) signal, and wherein the DMARQ, INTRQ, and IORDY signals are active high.

37. The system as recited in claim 35, wherein the mirroring logic is configured to enter the simultaneous write mode in response to receiving three consecutive writes to the ATA cylinder high register.

38. In a system comprising a controller a first storage device and a second storage device, wherein each of the pair of devices comprises a plurality of registers mapped to the same register address space, a method for configuring the first storage device and the second storage device to carry out a command from the controller simultaneously, the method comprising:
  performing at least the following actions to carry out the command from the controller simultaneously on the first and second storage devices:

writing to a first register in the address space to select the first storage device to respond to commands;

while the first storage device is selected to respond to commands, preventing the registers of the first storage device from being accessed;

while the registers of the first storage device are prevented from being accessed, writing to the first register in the address space to select the second storage device to respond to commands so that both the first storage device and the second storage device are selected to respond to commands;

while both the first and second storage devices are selected to respond to commands, allowing the registers of both the first storage device and the second storage device to be accessed; and while the registers of both the first and second storage devices are allowed to be accessed, writing a command to a command register in the register address space, wherein the first storage device and the second storage device receive the command and both carry out the command approximately simultaneously.

39. The method as recited in claim 38, wherein said writing to a first register in the address space to select the first storage device comprise writing a first value to corresponding registers of both the first storage device and the second storage device, wherein the first value selects the first storage device.

40. The method as recited in claim 38, wherein the registers of the first storage and the second storage devices are accessed via a plurality of control signals produced by the controller, and wherein said preventing the registers of the first storage device from being accessed comprises providing a portion of the control signals to only the second storage device such that the registers of the first storage device are not accessed.

41. The method as recited in claim 38, wherein said writing to the first register in the address space to select the second storage device comprises writing a second value to a register of the second storage device, wherein the second value selects the second storage device.

42. The method as recited in claim 38, wherein the registers of the first storage and second storage devices are accessed via a plurality of control signals produced by the controller, and wherein said allowing the registers of both the first storage device and the second storage device to be accessed comprise providing the control signals to both the first storage device and the second storage device such that the registers of the both the first storage device and the second storage device are accessed.

43. The method as recited in claim 38, wherein the command is a write command.

44. The method as recited in claim 43, further comprising:
determining if the first storage device is ready to receive data;
determining if the second storage device is ready to receive data;
performing the following if both the first storage device and the second storage device are ready to receive data:
allowing the registers of both the first storage device and the second storage device to be accessed; and
writing a block of data to corresponding data registers of the first storage device and the second storage device, wherein the first storage device and the second storage device store the data approximately simultaneously.

45. The method of claim 44, wherein said determining if the first storage device is ready to receive data comprises:
preventing the registers of the second storage device from being accessed; and
while the registers of the second storage device are prevented from being accessed, reading a value from a status register of the first storage device.

46. The method of claim 44, wherein said determining if the second storage device is ready to receive data comprises:
preventing the registers of the first storage device from being accessed; and
while the registers of the first storage device are prevented from being accessed, reading a value from a status register of the second storage device.

47. The method of claim 38, wherein said controller is an AT Attachment (ATA) controller and said first and second storage devices are ATA storage devices both coupled to the same port of said ATA controller.

48. A method for communicating with devices, comprising:
performing at least the following actions to carry out a same command on multiple devices:
sending a first communication to a first device configured as a master device, wherein said communication indicates that the first device, but not a second device configured as a slave device on the same communication channel as the master device, is selected to respond to subsequent communications;
subsequent to said sending a first communication, sending a second communication to the second device, wherein the second communication indicates that the second device, but not the first device, is selected to respond to subsequent communications, wherein said sending a second communication is performed while preventing the first device from recognizing the second communication so that both the first device and the second device are selected to respond to subsequent communications; and
subsequent to said sending a second communication and while both the first device and the second device are selected to respond to subsequent communications, sending a third communication to both the first device and the second device, wherein both the first device and the second device respond to the third communication.

49. The method as recited in claim 48, wherein said sending a first communication comprises writing a value to corresponding registers of both the first device and the second device, wherein the value selects the first device.

50. The method as recited in claim 48, said preventing the first device from receiving the second communication comprises providing a portion of communication control signals to only the second device such that the first device does not recognize the second communication.

51. The method as recited in claim 48, wherein said sending a second communication comprises writing a value to a register of the second device, wherein the second value selects the second device.

52. The method as recited in claim 48, further comprising:
determining if the first device is ready to receive data;
determining if the second device is ready to receive data; and if both the first device and the second device are ready to receive data, communicating a block of data to the first device and the second device while both the first device and the second device are selected, wherein the first storage device and the second storage device both store the data.

53. The method of claim 52, wherein said determining if the first device is ready to receive data comprises:

while preventing the second device from recognizing communications, reading a value from a status register of the first device.

54. The method of claim 52, wherein said determining if the second device is ready to receive data comprises:

while preventing the first device from recognizing communications, reading a value from a status register of the second device.

55. The method of claim 48, wherein said first and second devices are ATA storage devices both coupled to the same port of an ATA controller.

* * * * *

UNITED STATES PATENT AND TRADEMARK OFFICE
CERTIFICATE OF CORRECTION

PATENT NO. : 6,813,688 B2
DATED : November 2, 2004
INVENTOR(S) : Chia Y. Wu, Whay S. Lee and Nisha D. Talagala It is certified that error appears in the above-identified patent and that said Letters Patent is hereby corrected as shown below:

Column 17,
Line 26, after "channel;", please delete "and".

Column 18,
Line 51, please delete "comprise" and insert -- comprises -- in place thereof.

Column 19,
Line 6, after "forming to an", delete "AT" and insert -- ATA -- in place thereof.
Line 30, please delete "configure" and insert -- configured -- in place thereof.
Line 58, after "master device", please delete "an" and insert -- and -- in place thereof.

Column 20,
Line 3, after "wherein the", please delete "AT" and insert -- ATA -- in place thereof.

Column 21,
Lines 25 and 49, please delete "comprise" and insert -- comprises -- in place thereof.

Signed and Sealed this

Fifteenth Day of March, 2005

JON W. DUDAS
*Director of the United States Patent and Trademark Office*